United States Patent [19]

Kho

[11] Patent Number: 5,489,107
[45] Date of Patent: Feb. 6, 1996

[54] SUITCASE WHEEL ASSEMBLY AND RETAINER

[76] Inventor: Dick T. Kho, P.O. Box 34454, W. Los Angeles, Calif. 90034

[21] Appl. No.: 274,745

[22] Filed: Jul. 14, 1994

[51] Int. Cl.$^6$ ..................................................... B62B 1/12
[52] U.S. Cl. ........................ 280/47.131; 280/30; 280/37; 280/47.26; 190/18 A
[58] Field of Search ................. 280/30, 37, 47.131, 280/47.18, 47.24, 47.26, 63; 190/15.1, 18 A; 16/262

[56] References Cited

U.S. PATENT DOCUMENTS

| | | | |
|---|---|---|---|
| 2,510,310 | 6/1950 | Francis | 446/469 |
| 3,788,689 | 1/1974 | Lloyd | 292/304 |
| 3,805,325 | 4/1974 | Lee | 16/262 |
| 3,997,038 | 12/1976 | Walker | 190/18 A |
| 4,122,924 | 10/1978 | Wasserman | 190/18 A |
| 4,900,043 | 2/1990 | Kho | 280/37 |
| 5,188,381 | 2/1993 | Kho | 280/37 |
| 5,259,215 | 11/1993 | Rocca | 280/47.26 X |
| 5,286,047 | 2/1994 | Kho | 280/47.131 |

Primary Examiner—Brian L. Johnson
Attorney, Agent, or Firm—Monty Koslover Assoc.

[57] ABSTRACT

A device for transporting a suitcase is provided including a removeable wheel assembly and two supporting brackets which are permanently attached integral with the suitcase. The wheel assembly includes a handle which is welded to the assembly axle and is used to install the wheel assembly on the brackets by positioning the axle across the brackets, parallel to the bottom surface of the suitcase, then rotating the handle and axle through an angle until the axle and handle are retained by the brackets. The suitcase may then be easily transported over uneven surfaces on the two large wheels provided by the device. An alternate embodiment provides a plastic handle that may be removed for convenient storage.

9 Claims, 3 Drawing Sheets

5,489,107

SUITCASE WHEEL ASSEMBLY AND RETAINER

BACKGROUND AND SUMMARY OF THE INVENTION

This invention relates to a wheel assembly that is attached to a suitcase so that a person may transport a suitcase along the ground, and more particularly to a suitcase with integral support brackets for releaseably holding a wheel assembly.

This invention is an improvement over my previous patent U.S. Pat. No. 5,286,047. U.S. Pat. No. 5,286,047 describes a wheel assembly which is mounted on a suitcase by at least two retaining brackets which are integral with the suitcase frame. The wheel assembly includes a handle welded to the axle. By lifting and rotating the handle, the wheel assembly may be disengaged from the retaining brackets and removed from the suitcase. In reverse sequence, using the handle the wheel assembly may be mounted and engaged securely by the retaining brackets.

In order for the retaining brackets to properly capture and retain the wheel assembly axle, two spaced apart flattened axle portions were incorporated. In addition, the bracket retaining slots were circular and sized to fit the axle, permitting rotation. The slot opening was made narrow, permitting entry of a flattened portion of the axle. A rotation of the axle by 90 degrees in the slot and clamping the handle in a retaining bracket secured the wheel assembly in place.

On reviewing the previous invention described above, the inventor has concluded that the wheel assembly axle would be stronger if the axle flat portions could be eliminated. When a suitcase is standing on its side, as would be the normal usage, it would be much easier to install the axle in the bracket retaining slots if the retaining slots faced slightly upward and the handle did not have to be rotated a full 90 deg. as is required for the previous invention. It would also be an improvement if the brackets, which are permanently attached to the suitcase, had a lower profile and projected less during suitcase storage. An additional improvement would be the provision of a removable handle, permitting easy disassembly of the wheel assembly for compact stowing.

These improvements have been incorporated in the preferred and alternate embodiments of the present invention.

The present invention, like its predecessor, has the object and advantage of providing improved mobility for a suitcase while being relatively inexpensive to manufacture and assemble. In addition, the present invention by reason of its improvements, is also even less expensive to manufacture than the previous invention. Further objects and advantages of the present invention will become apparent from a study of the following portion of the specification, the claims and the attached drawings.

DESCRIPTION OF THE PREFERRED AND ALTERNATE EMBODIMENTS

Figure 1:
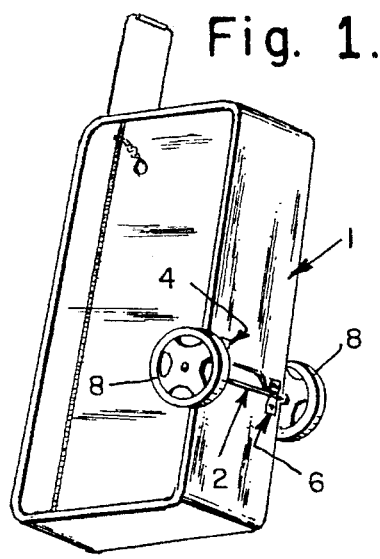
FIG. 1 is a generally perspective view showing the wheel assembly transport device according to the present invention attached to brackets in place on the bottom of a suitcase.

Referring particularly to the drawings, there is shown in FIG. 1 a perspective view of a wheel assembly 2 according to the present invention mounted in place on the bottom of a suitcase 1 by means of two support brackets 4, 6. The wheel assembly 2 includes two large wheels 8 that are particularly useful in transporting the suitcase over rough surfaces. As will be illustrated and discussed later, the wheel assembly 2 can be released from the support brackets 4, 6 which are integral with the suitcase, and the wheel assembly 2 may then be stored. The wheel assembly 2 can be re-installed easily on the suitcase support brackets without the use of any tools, when ever so desired.

Figure 2:
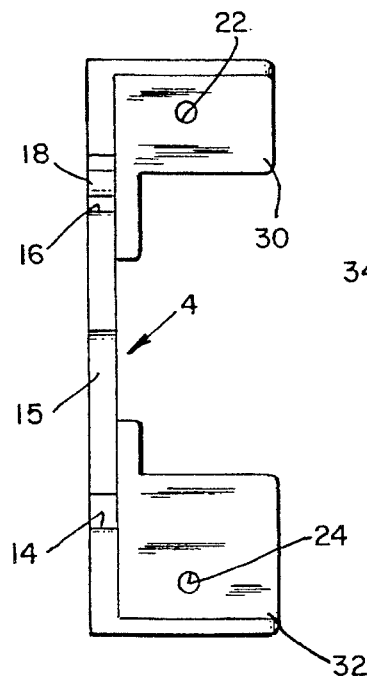
FIG. 2 is a plan view of the left support bracket, particularly illustrating the two base portions which attach the bracket to a suitcase.
Figure 3:
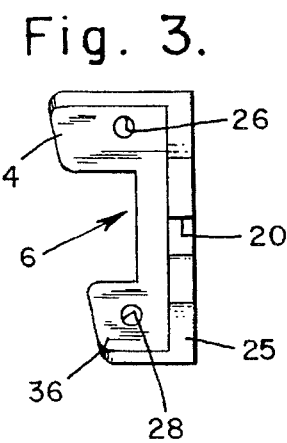
FIG. 3 is a plan view of the right support bracket.
Figure 4:
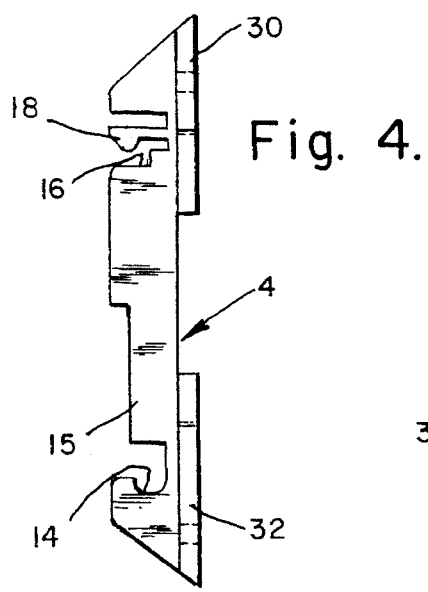
FIG. 4 is a side elevation view of the left support bracket particularly showing the slots used to retain the axle and handle members.
Figure 5:
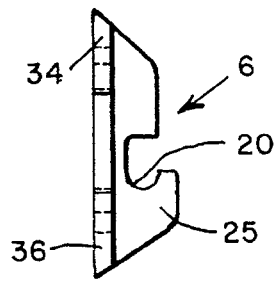
FIG. 5 is a side elevation view of the right support bracket particularly showing a slot used to retain the axle member.
Figure 6:
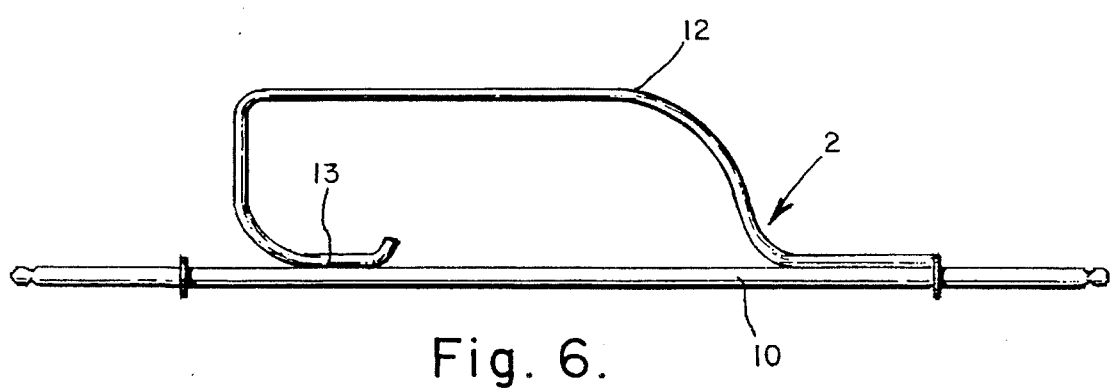
FIG. 6 is a plan view of the wheel assembly without its wheels for clarity, according to the present invention.

The invention requires that releaseable retaining means be provided for holding the wheel assembly 2 to a suitcase 1. This function is provided by two brackets, a left bracket 4 and right bracket 6 which are illustrated in detail in FIGS. 2, 3, 4 and 5. FIGS. 2 and 3 are plan views, respectively of the left bracket 4 and the right bracket 6, while FIGS. 4 and 5 are side elevation views of the two brackets. FIG. 6 is a plan view of the preferred embodiment axle/handle assembly which is a wheel assembly without the wheels. It should be understood that the configuration of the brackets 4, 6 relates directly to the axle 10 and its welded handle 12 shape and size as shown in FIG. 6.

Referring now to FIGS. 2 and 4, it is seen that the left bracket 4 is shaped as an angle having two planar portions at 90 degrees apart, one planar portion being wider than the other. The wide portion is the base and the narrow portion forms the bracket wall 15. A central cutout divides the base into two tabs 30, 32. These tabs are used to fasten the bracket 4 to a suitcase using screws placed through two holes 22, 24 located in the center of the tabs 30, 32. The bracket wall 15 is made long enough to accommodate a first slot 14, a second slot 16 and flexible finger 18 cut in the wall 15 for retaining the axle portion and the handle portion of the wheel assembly. The first and second slots 14, 16 must be separated by the same distance as top portion of the handle 12 and the handle/axle joint 13 for the wheel assembly to fit in the slots and be securely retained by the slots on the bracket wall 15.

The first slot 14 is made wide enough to comfortably accommodate the axle and handle joint 13 width while the opening to the first slot 14 has a width equal to the axle 10 diameter plus clearance. This permits the wheel assembly 2 to have its handle/axle joint inserted vertically through the first slot 14 opening and be rotated a certain angle so that the wheel assembly is retained by the bracket and can not fall out. The second slot 16 is sized to receive the handle 12 diameter and is cut so that a flexible finger 18 is formed as one side of the slot. The flexible finger 18 serves to clamp the handle 12 top tightly, snapping against the handle when it is rotated and pushed into the second slot 16. The second slot 16 is placed somewhat higher up the wall 15 from the base than is the first slot 14 so that the required rotation angle to snap in the handle is less than 90 degrees.

Refer now to FIGS. 3 and 5. It is seen that similarly to the left bracket 4, the right bracket 6 has an angle cross section with two planar portions at 90 degrees apart, one planar portion being wider than the other. The wide portion is the base and the narrow portion forms the bracket wall 25. A central cutout divides the base into two tabs 34, 36. These tabs are used to fasten the bracket 6 to a suitcase using screws placed through two holes 26, 28 located in the center of the tabs 34, 36. The right bracket 6 is shorter in length than the left bracket 4 because only one slot 20 is required in its wall portion 25. The right bracket slot 20 is made identical to the first slot 14 in the left bracket because it also has to accommodate and retain a handle 12 and axle 10 welded joint.

It is notable that looser tolerances in the size, shape and locations of the bracket slots are required as compared with the bracket slots described in U.S. Pat. No. 5,286,047. This important manufacturing advantage is because of modifications made to the axle/handle portion of the wheel assembly.

Both the left bracket 4 and right bracket 6 are fabricated from a rigid plastic material for the sake of light weight and ease of manufacturing.

As shown in FIG. 6, the axle/handle portion of the wheel assembly comprises a metal axle 10 and a metal handle 12; the handle 12 being bent and shaped to form two straight portions, one at each end of the handle, which are welded to the axle 10 parallel with its axis. There are no flat portions cut into the axle as is the case for the prior U.S. Pat. No. 5,286,047. Axle cut 'flats' are not required because the axle/handle welded portions provide the equivalent of a flat surface for the purpose of retaining the wheel assembly 2 in the brackets 4, 6. The present invention axle 10 is thereby made much stronger than the prior patent axle.

Figure 7:
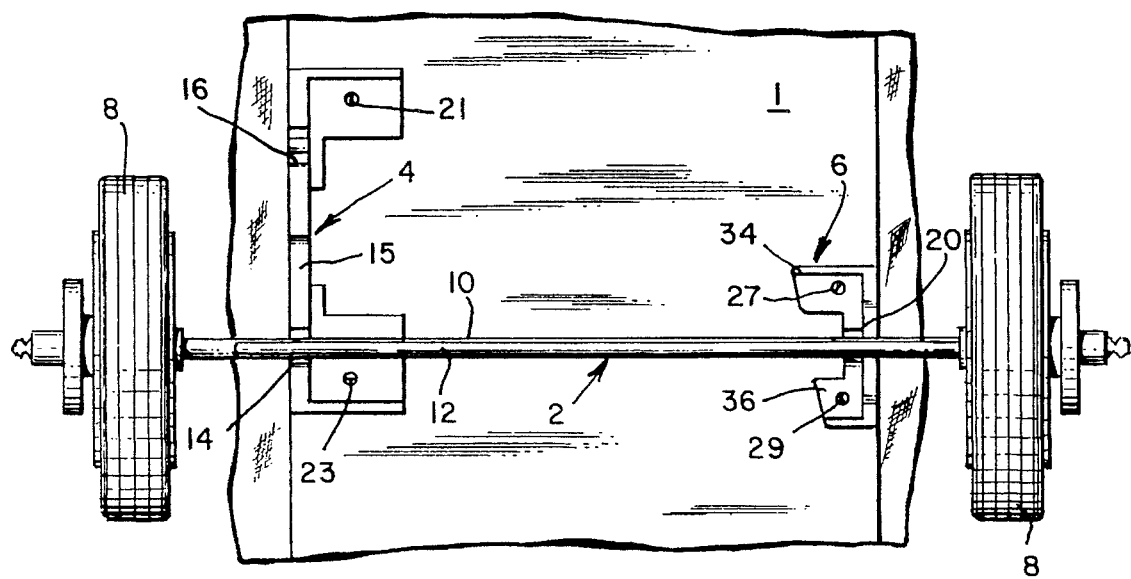
FIG. 7 is a plan view of the wheel assembly of the present invention with its axle portion inserted in the suitcase bracket slots and its handle portion positioned vertically to the plane of the paper and the suitcase.
Figure 8:
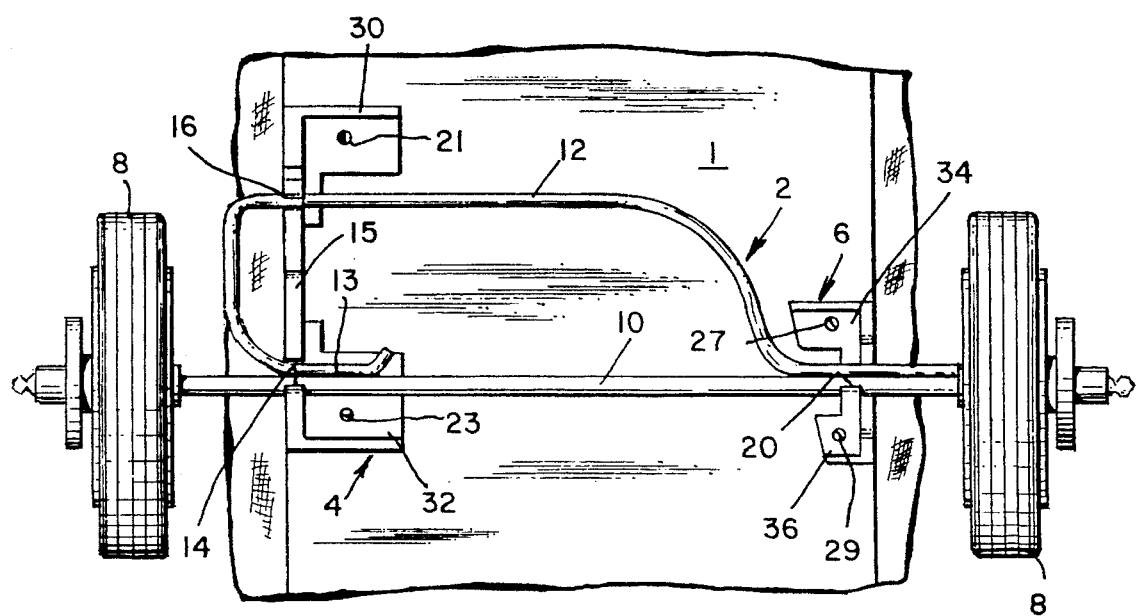
FIG. 8 is a plan view of the wheel assembly of the present invention showing its handle portion rotated and held in a slot in the left support bracket and retaining the wheel assembly.

Referring now to FIG. 7, there is shown a plan view of the preferred embodiment wheel assembly 2 mounted on the bottom outside panel of a suitcase 1, which is shown partially. In this view, the wheel assembly 2 has been inserted through the openings of left bracket first slot 14 and right bracket slot 20, but the wheel assembly handle 12 has not been rotated; it remains vertical to the plane of the suitcase bottom. In FIG. 8, the wheel assembly handle 12 has been rotated sufficiently to snap the handle into the left bracket second slot 16. In this handle position, the wheel assembly 2 is secured and retained by means of the bracket 4, 6 slots.

As illustrated in FIGS. 7 and 8, the left bracket 4 and right bracket 6 must be located on a suitcase bottom surface at a distance apart corresponding to the distance between the two 'flat' areas formed by the axle-handle welded portions neap both ends of the axle. It is also important that the slot 20 in the right bracket 6 be lined up with the first slot 14 in the left bracket 4, so that the wheel assembly wheels 8 can rotate in parallel with the sides of the suitcase 1 rather than slant into them. Lining up the bracket slots on the suitcase bottom can be done using a template marking the bracket positions. The brackets 4, 6 are bolted to the suitcase 1 frame using bolts 21, 23, 27, 29 passed through the bracket tab holes 22, 24, 26, 28 and are fastened permanently to the suitcase frame, becoming integral with the frame.

On reviewing the design of the wheel assembly and the brackets, it is clear that both bracket wall heights can be minimized and form a lower projection from a suitcase bottom than is the case for the previous invention U.S. Pat. No. 5,286,047. This is a desired improvement. The ease of installing the present invention wheel assembly is also somewhat better because the wheel assembly may be now easily installed with the suitcase on its end with the sides vertical as in FIG. 1 rather than suitcase bottom facing up. Other improvements incorporated in the present invention are the strengthening of the axle by removal of flats cut in it and lowered manufacturing cost due to the modified handle/axle design and looser tolerances required for the bracket slots. The objects of the invention are thus achieved.

Figure 9:
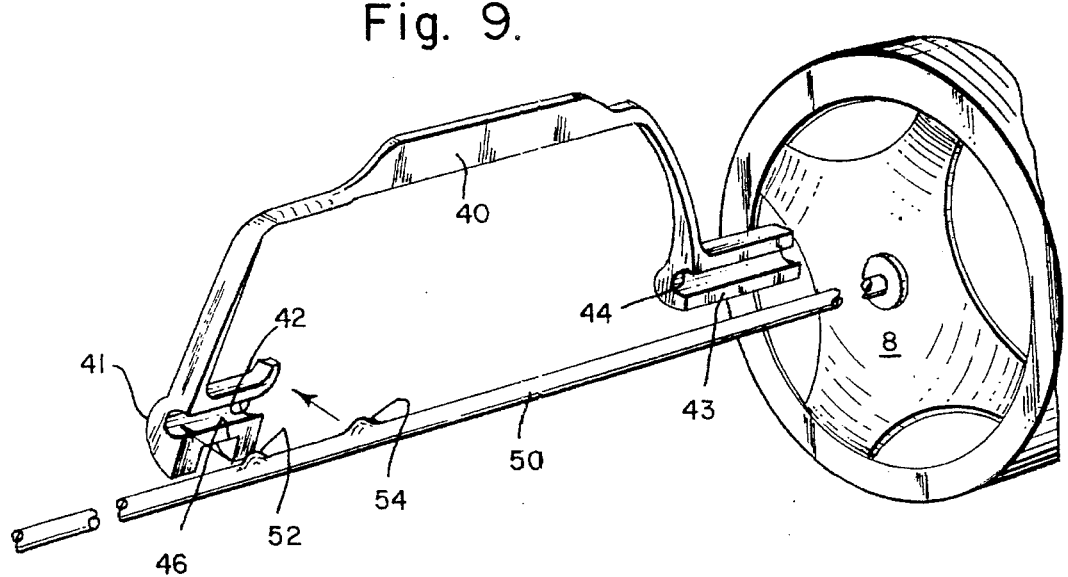
FIG. 9 is a partial perspective view of an alternate embodiment of the wheel assembly, particularly illustrating a separate, detachable handle portion and modified axle portion.
Figure 10:
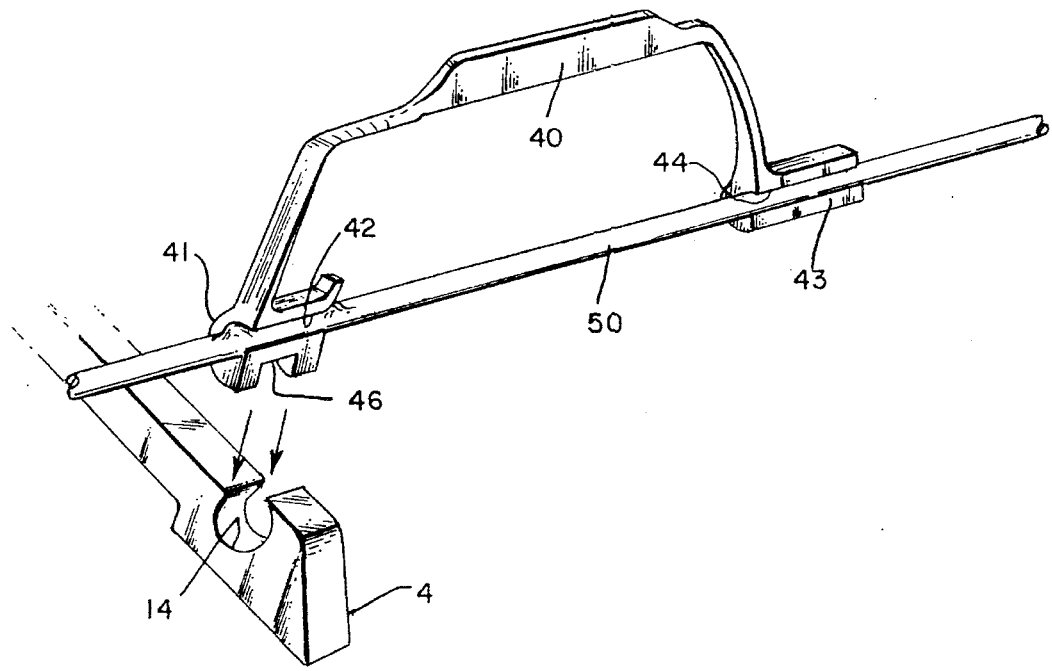
FIG. 10 is a partial perspective view of an alternate embodiment of the wheel assembly, particularly showing the handle assembled to the axle portion and useful in showing how the handle grooves fit over the left support bracket retaining slot.

Referring now to FIGS. 9 and 10 there are shown partial perspective views of an alternate embodiment of the wheel assembly. In FIG. 9, only one of the two wheels 8 is shown for the sake of clarity to avoid obscuring the left portion of the handle 40. The alternate embodiment of the wheel assembly comprises a handle 40, an axle 50 and two wheels 8. Unlike the preferred embodiment wheel assembly, the handle 40 is made of a rigid plastic material and is not permanently joined to the axle 50 which is made of metal. The left bracket 4 and right bracket 6 used with the alternate embodiment wheel assembly are the same as depicted in FIGS. 2, 3, 4 and 5 and are as described earlier in this specification.

Use of a separate, removable handle 40 provides several advantages over the preferred embodiment: It permits fabrication of the handle from rigid plastic material instead of metal, enabling mass production of the handle member and lower fabrication costs. Welding the handle to the axle is avoided. The handle 40 can be disconnected from the axle 50 for storage convenience. In addition, variations in the handle configuration can be made and used without requiring a modification to the axle.

The handle 40 is formed in an approximate inverted flattened "U" shape with the arms of the U somewhat shorter than the cross bar. At the end of each of the arms is located a projecting portion which serves as an axle grip 41, 43. These axle grips 41, 43 are oriented so that they each project in a direction parallel with and in the approximate plane of the top of the handle 40. A groove 42, 44 having a diameter large enough to tightly grip the axle 50 diameter is formed along the central axis of each axle grip 41, 43. A cutout wide groove 46 is formed in the bottom of the left axle grip 41 as a means of fixing the wheel assembly lateral position with respect to the left bracket 4 and its first slot 14. The left axle grip bottom groove 46 fits over the bottom of the first slot 14 as shown in FIG. 10 with the groove walls fitting over the sides of the bracket, thus preventing sideways lateral movement.

The axle 50 is modified by including two point projections 52, 54 at a given location on the axle. The projections are selected to be where it is desired to fit one of the axle grips 41, 43 to the axle. In FIGS. 9, 10, the points 52, 54 location shown on the axle is at the left axle grip 41. It could just as well have been located at the right axle grip 43. The projections 52, 54 are separated on the axle by the length of an axle grip 41, so that the axle grip groove 42, 44 can be snapped on the axle between point projections which serve to precisely locate the handle 40 with respect to the axle 50 as shown in FIGS. 9 and 10.

As is the case for the preferred embodiment, the first slot 14 in the left bracket 4 and the slot in the right bracket 6 are sized in width to accommodate the axle/handle joint portion which constitutes a relatively 'flat' area. For the alternate embodiment wheel assembly, the bracket slots which retains the axle/handle joints would be a little wider than for the preferred embodiment. This is considered to be a minor difference.

From the above description, it is clear that the preferred and alternate embodiments achieve the objects of the present invention. Various modifications may be apparent to those skilled in the art. These and modifications are considered to be within the spirit and scope of the present invention.

Having described the invention, what is claimed is:

1. A transport device for a suitcase, comprising:
   (a) a wheel assembly, said wheel assembly comprising a metal round axle, a metal bent member joined to said axle and extending outwardly from said axle, and a pair of wheels supported on the ends of said axle, said metal bent member having a long portion and two short portions parallel with said axle, said long portion defining a handle adapted to be grasped by an operator, said short portions being welded to said axle forming two separated axle-handle joints which have a wide cross-section dimension in the plane of said handle and axle, and a short cross-section dimension perpendicular to the plane of said handle and axle;
   (b) a first support bracket and a second support bracket, each said support bracket being fabricated from rigid plastic material and having a right angle cross-section, having a wide planar portion and a narrow planar portion 90 degrees apart, said wide planar portion defining a base and said narrow planar portion defining a wall, said base on each said support bracket including a first and second hole sized for the purpose of bolting said base to a suitcase; and
   (c) means for releaseably retaining said wheel assembly on said support brackets, said means arranged so that an operator may grasp said handle with said handle vertically upward, place said wheel assembly across said support brackets and rotate said handle a certain angle until said axle-handle joints are captured by said means, rotating said handle further until said handle is also captured by said means, said operator being able to release and remove said wheel assembly by reverse sequence action.

2. A device as in claim 1 wherein said first support bracket and said second support bracket are integral with a suitcase structure.

3. A device as in claim 1 wherein said means for releaseably retaining said wheel assembly on said support brackets includes a first slot and second slot transversely disposed in the wall of said first support bracket and a third slot cut in the wall of said second support bracket, said second slot being separated from said first slot by a distance equal to the distance between said axle and a top portion of said handle, said first slot and said third slot each having a width able to comfortably accommodate said wide cross-section dimension of said axle-handle joints and having a slot opening permitting only the entry of said short cross-section dimension of said axle-handle joint, said first and third slots thus permitting insertion of said wheel assembly axle therein and rotation of said wheel assembly axle by said handle through a certain angle, preventing said wheel assembly from exiting said slots and releaseably retaining said wheel assembly;

said second slot being sized to accommodate the diameter of said handle, and including a flexible finger formed on one vertical edge of said slot so that when said handle is pushed into said second slot, said flexible finger will clamp said handle tightly, holding said handle in place.

4. A transport device for a suitcase, comprising:
   (a) an axle assembly comprising a metal round axle and a pair of wheels supported on the ends of said axle;
   (b) a handle member made of rigid plastic and releaseably attached to said axle, said handle member being shaped in an approximate flattened U shape, having two arms and a cross-bar portion, said two arms being somewhat shorter in length than said cross-bar portion, said cross-bar portion defining a grasping means for an operator, each said arm including at an end a projecting portion, said projecting portions being oriented in a direction parallel with said cross-bar portion and with said axle;
   (c) means for releaseably attaching said handle member to said axle and forming two separated axle-handle joints;
   (d) a first support bracket and a second support bracket, each said support bracket being fabricated from rigid plastic material and having a right angle cross-section, having a wide planar portion and a narrow planar portion 90 degrees apart, said wide planar portion defining a base and said narrow planar portion defining a wall, said base on each said support bracket including a first and second hole sized for the purpose of bolting said base to a suitcase; and
   (e) means for releaseably retaining said axle assembly and handle on said support brackets, said means arranged so that an operator may grasp said handle member with said handle member vertically upward, place said axle assembly across said support brackets and rotate said handle a certain angle until said axle-handle joints are captured by said means, rotating said handle further until said handle is also captured by said means, said operator being able to release and remove said axle assembly and handle by reverse sequence action.

5. A device as in claim 4 wherein said means for releaseably attaching said handle member to said axle includes a first groove cut in the longitudinal axis of each said projecting portion of said handle, each said first groove having a diameter sized to tightly grip said axle diameter in said groove, thereby making two effective axle-handle joints when two said projecting portions are attached to said axle.

6. A device as in claim 5 wherein said axle includes two points projecting radially from said axle, said points being located near one end of said axle and spaced apart by a distance equal to the length of said projecting portion of said handle, plus clearance, said points acting to receive and locate said projecting portion on said axle and preventing lateral movement of said handle with respect to said axle.

7. A device as in claim 4 wherein said first support bracket and said second support bracket are integral with a suitcase structure.

8. A device as in claim 4 wherein said means for releaseably retaining said axle assembly and handle on said support brackets includes a first slot and second slot transversely disposed in the wall of said first support bracket and a third slot cut in the wall of said second support bracket, said second slot being separated from said first slot by a distance equal to the distance between said axle and said cross-bar portion of said handle, said first slot and said third slot each having a width able to comfortably seat said axle-handle joints therein when said axle-handle joints are vertically inserted into said first and third slots, said first and third slots thus permitting insertion of said axle-handle joints therein and rotation of said axle assembly by said handle through a certain angle, preventing said axle-handle joint from exiting said slots and releaseably retaining said axle-handle joint;

said second slot being sized to accommodate the diameter of said handle, and including a flexible finger formed on one vertical edge of said slot so that when said handle is pushed into said second slot, said flexible finger will clamp said handle tightly, holding said handle in place.

9. A device as in claim 5 wherein at least one said projecting portion of said handle has a second groove cut in the periphery of said projecting portion transverse to said first groove, said second groove sized in width to fit transversely over said first slot of said support bracket, such that said projecting portion grips and overhangs said support bracket, preventing lateral movement of said axle and handle member with respect to said support bracket.

* * * * *